Sept. 20, 1949.  W. R. HARRIS ET AL  2,482,483
REGULATING SYSTEM
Filed Nov. 30, 1944
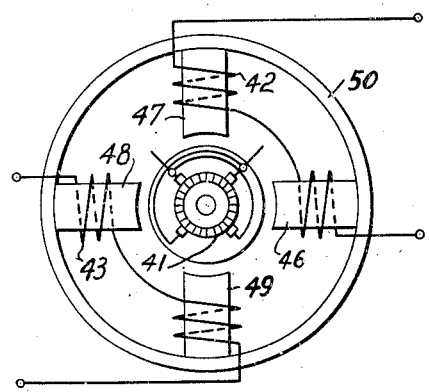
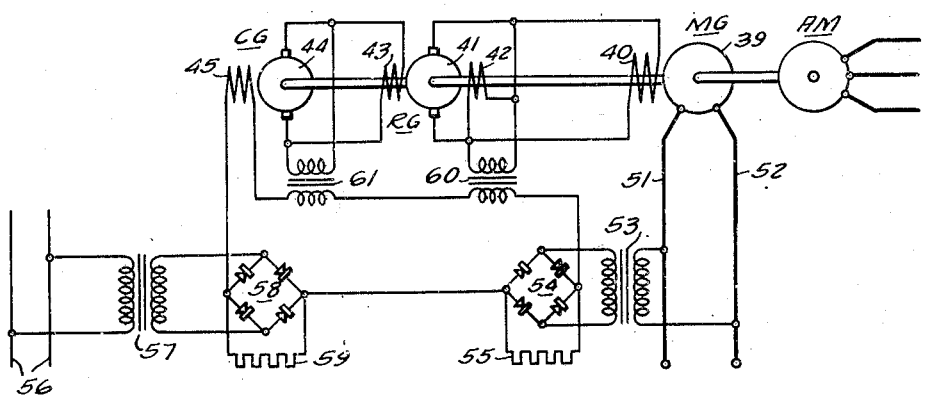
WITNESSES:
INVENTORS
Walter R. Harris and
Charles F. Wagner.
BY
Paul E. Friedemann
ATTORNEY Patented Sept. 20, 1949

2,482,483

UNITED STATES PATENT OFFICE 2,482,483

REGULATING SYSTEM

Walter R. Harris, Wilkinsburg, and Charles F. Wagner, Pittsburgh, Pa., assignors to Westinghouse Electric Corporation, East Pittsburgh, Pa., a corporation of Pennsylvania Application November 30, 1944, Serial No. 565,910

3 Claims. (Cl. 322—28)

Our invention relates to electric systems of tandem-connected rotary generators and more particularly to systems in which the field excitation of a main generator is controlled or regulated by an auxiliary generator with one or several control field windings.

To provide the auxiliary generators of such systems, in addition to the control field windings, with a self-exciting field winding in order to increase the ratio and sensitivity of the amplifying control operation of this generator is known in the art. This self-exciting winding has been mounted on the same magnetic field poles as the control field winding thus obtaining maximum mutual inductance between these different windings.

It is an object of our invention to provide a system of tandem-connected rotary generators which affords a considerably higher speed of response to regulating or control effects than obtainable with the above-mentioned known systems of this type.

In certain cases of application of tandem-connected generator systems, such as for producing a voltage-regulated high frequency output current, the high inductance and long time constant of the main rotary machine for generating the output current tends to render the regulating response of the known system rather sluggish. Hence, it is among the more specific aims of our invention to devise a generator system of quick-responding regulating function which, as to constancy of output voltage or speed of response to control impulses, satisfies exacting requirements beyond the capacity of the above-mentioned known systems of this type.

It is also an object of our invention to improve generator systems, of the type referred to, as regards the sensitivity and amplification factor of the control or regulating function performed by the auxiliary generator means.

Still another object, allied to the foregoing, is to design a generator system which, despite an increased speed or rate of response of its output to changes in control input, is substantially free of hunting.

Referring to tandem-connected generator systems of the general type above-mentioned, we have discovered, according to this invention, that the speed or rate of the regulating or control effect performed by the system is increased to a considerable extent if the self-energizing winding and the separately energized winding or windings of the auxiliary generator means are separated from each other in such a manner that their mutual inductance is only a fraction of that obtaining with the customary common-pole arrangement or if the mutual inductance is virtually fully eliminated. Hence, in order to achieve the above-mentioned aims and objects, we place the self-exciting winding or windings of the regulating (auxiliary) generator means of the system on magnetizable pole structures different from those that carry the control field winding so that a substantial portion or almost all of the magnetic flux caused in the field structure by the self-exciting winding or windings extends through a field flux path different from that of the control field winding.

According to another feature of the invention, subordinate to the foregoing, we separate in the auxiliary generator means the magnetic circuit of the self-energizing winding from the control winding by providing separate magnetic field poles for these different windings so that their mutual inductance is negligible or zero.

These and other objects and features of our invention will be apparent from the following description in conjunction with the embodiment illustrated in the drawing, in which:

Figure 1 shows schematically the circuit diagram of a control system which embodies amplifying regulating means according to the invention; and Fig. 2 represents schematically the control generator used in the system of Fig. 1.

Fig. 1 illustrates a generator system for feeding an alternating current circuit. The energy for this circuit is generated by a main generator MG whose armature and field winding are denoted by 39 and 40, respectively. Field winding 40 is energized by a regulating generator RG. This generator has its armature 41 connected across field winding 40 and is equipped with a self-energizing shunt field winding 42 and a control field winding 43. The control field winding 43 is excited from the armature 44 of a control generator CG whose field winding 45 receives excitation from a control circuit with two counteracting voltage sources, one serving to supply a measured magnitude while the other represents a standard of comparison as explained in conjunction with the foregoing examples. More in detail the mains 51 and 52 of the main generator load circuit energize a transformer 53 which feeds a rectifier 54 for impressing a measured voltage across a resistor 55. Similarly, an alternating current line 56 is connected through a transformer 57 to a rectifier 58 which imposes a constant voltage across a resistor 59. Resistors 55 and 59 are so rated and connected that no excitation is imposed on field winding 55 as long as the system is in steady state operating condition and produces an output voltage in accordance with the desired value. Any departure of the output voltage from this value will cause the field winding 45 to introduce a corrective effect which changes the field excitation of the main generator in the direction and by the amount required for reestablishing the normal conditions.

As mentioned above, the self-energizing field winding 42 and the control field winding 43 in the system according to Fig. 1 are disposed within the same generator RG. However, these two windings are separated from each other in the manner apparent from Fig. 2.

According to Fig. 2 the regulating generator RG has two pairs of field poles denoted by 46, 47 and 48, 49, respectively. These poles are magnetically interconnected by the stator frame or casing 50 of the machine. The self-energizing field winding 42 is disposed on poles 46 and 47 while the control field winding 43 is placed on poles 48 and 49. Due to this arrangement the main path of the magnetic flux induced in the magnetizable field structure by the self-energizing winding 42 is largely different from the flux path in the field pole structure appertaining to the control winding 43. Although a certain degree of mutual inductance cannot be avoided in a design of this type due to the fact that the two pairs of poles are magnetically connected by the frame, the mutual inductance between windings 42 and 43 is nevertheless extremely much lower than in machines which carry both windings on the same poles. It was found that the mutual coupling between the two field windings can be reduced in this manner to a small fraction, for instance approximately 4%, of the value it would have if the mutual inductance were perfect. As a result, the present system according to Fig. 1 involves an appreciable improvement as to speed or response and magnification factor in comparison with the known generator systems of this type.

Referring to the above described embodiment the following equations serve to elucidate the increase in speed or rate of response to regulating or control effects obtained by virtue of our invention.

With a nearly perfect mutual inductive coupling between the control field winding and the self-energizing winding of an amplifying dynamo, such coupling being nearly obtained in the known control generators whose field windings are all on the same poles, the build up time (T) of the generator output voltage (e) in response to an input voltage (E) impressed on one of the control field windings is given by the equation:

$$e = \frac{EC^2N_1N_2}{R_1L_2+MN_1C}\left[T+\left(\frac{L_2}{N_2C}+\frac{M}{N_1C}-\frac{L_1L_2-M^2}{R_1L_2+MN_1C}\right)\left(1-\epsilon^{-\left(\frac{R_1L_2+MN_1C}{L_1L_2-M^2}\right)T}\right)\right] \quad (1)$$

When the mutual coupling is zero, as is the case in control means according to Figs. 1 or 2 for instance, the build up time (T) of the output voltage (e) is given by the equation:

$$e = \frac{EC^2N_1N_2}{R_1L_1}\left[T+\left(\frac{L_2}{N_2C}-\frac{L_1}{R_1}\right)\left(1-\epsilon^{-\frac{R_1}{L_1}T}\right)\right] \quad (2)$$

In these equations,

C = ratio of voltage to ampere turns of the field windings
$N_1$ = number of turns in the control field winding
$N_2$ = number of turns in the self-energizing field winding
$R_1$ = resistance of control field winding (the resistance $R_2$ of the self-energizing field winding does not appear in the equations because the resistance line is adjusted so that it coincides with the no-load saturation curve of the self-energizing field)
$L_1$ = inductance of the control field winding
$L_2$ = inductance of the self-energizing field winding
M = mutual inductance between the control and self-energizing field windings.
$\epsilon$ = natural or Napierean base = 2.718...

The voltage values e and E in both equations are in volts, the build up time T is in seconds, the units of inductance are in henries, and the resistance units are in ohms.

For practical purposes and without undue loss in accuracy some of the parenthetical expressions in both equations can be neglected because their value is small as compared with the value of T. Hence the equations can be simplified to read as follows:

$$e = \frac{EC^2N_1N_2}{R_1L_2+MN_1C}\cdot T \quad (3)$$

$$e = \frac{EC^2N_1N_2}{R_1L_2}\cdot T \quad (4)$$

The term $MN_1C$ is usually much greater than the term $R_1L_2$. Hence, it will be seen from Equations 3 and 4 that with the almost perfect mutual inductance obtaining when control and self-energizing field windings are on the same poles the build up will be relatively slow, while with zero mutual inductance a much faster build up is attained.

Due to the rapidity of response, systems according to the invention may show the tendency to hunt when the input or signal voltage of the auxiliary generator or set of generators is subjected to rapid changes. However, such tendency can be reduced to overcome by the use of anti-hunting means, for instance in the manner exemplified in Fig. 1 by the damping transformers denoted by 60 and 61. Transformer 60 has its primary connected across the main generator field winding 40 while its secondary is series connected in the energizing circuit of the control field winding 45. Transformer 61 is primarily connected across the control field winding 43 of generator RG while its secondary is also connected in the circuit of control field winding 45. During steady state operation the primary circuits of both transformers carry direct current of constant or zero magnitude so that no voltage is induced in the transformer secondaries. Hence, under normal conditions these transformers have no effect on the above described control operation. During periods of voltage change, however, a secondary voltage is produced and the polarity of the transformer characteristics is so chosen that the direction of this secondary voltage has a damping effect and hence counteracts the hunting tendency. It will be understood that in many cases of application of our invention such damping transformers are not required and that in other cases only one of the damping transformers or other suitable damping means may be employed.

It will be apparent to those skilled in the art from the different modifications described in the foregoing that control systems and amplifying generators or generator combinations according to our invention can be modified in various respects without departing from the gist and essential features of the invention as set forth in the claims appended hereto.

We claim as our invention:

1. A generator system for providing a load circuit with regulated voltage, comprising a main generator having an armature for generating said voltage and having a main field winding for controlling said voltage, a regulating generator having an armature connected to said main field winding and having a magnetic field structure with two magnetic circuits of substantially negligible mutual inductance both linking said latter armature, one of said magnetic circuits being provided with self-excited field winding means of a resistance line approximately coincident with the no-load magnetization characteristic of the regulating generator, said other magnetic circuit being provided with a separately excited field winding, a control generator having an armature connected to said separately excited field winding and having a control field winding, and electric circuit means connected to said control field winding for varying its excitation in accordance with the voltage generated by said main generator.

2. An electric generator system comprising a main generator having an armature for providing output voltage and having a main field winding for controlling said output voltage, a regulating generator having an armature electrically connected to said main field winding to control the excitation of said main field winding, said regulating generator having a magnetic field structure with four poles of alternating opposite magnetic polarity, two adjacent ones of said poles being provided with a self-excited field winding connected across said latter armature, said other two poles being provided with a separately excited field winding, a control generator having an armature connected to said separately excited field winding and having a control field winding for varying the excitation of said self-excited field winding, and variable voltage means connected to said control field winding.

3. An electric generator system, comprising a main generator disposed for providing an output voltage and having a main field winding for controlling said output voltage, a regulating generator having an armature electrically connected to said main field winding to control the excitation of said main field winding and having a magnetic field structure with four poles of alternating opposite magnetic polarity, two adjacent ones of said poles being provided with self-excited field winding means that are connected to said latter armature, and rated so as to have a resistance characteristic substantially coincident with the no-load magnetization characteristic of said regulating generator, said other two poles being provided only with separately excited field winding means, and electric circuit means of variable voltage connected to said separately excited field winding means for controlling said regulating generator.

WALTER R. HARRIS.
CHARLES F. WAGNER.

REFERENCES CITED

The following references are of record in the file of this patent:

UNITED STATES PATENTS

| Number | Name | Date |
|--------|------|------|
| 1,255,400 | Ferris | Feb. 5, 1918 |
| 1,775,536 | Park | Sept. 9, 1930 |
| 1,787,028 | Ytterberg | Dec. 30, 1930 |
| 1,976,499 | Hochstetter | Oct. 9, 1934 |
| 2,000,699 | Harding | May 7, 1935 |
| 2,012,426 | Gulliksen | Aug. 27, 1935 |
| 2,335,784 | Montgomery | Nov. 30, 1943 |